US009475469B2

(12) United States Patent
Takahashi et al.

(10) Patent No.: US 9,475,469 B2
(45) Date of Patent: Oct. 25, 2016

(54) ELECTRIC BRAKE SYSTEM

(75) Inventors: Toru Takahashi, Iwata (JP); Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 182 days.

(21) Appl. No.: 14/131,705

(22) PCT Filed: Jul. 9, 2012

(86) PCT No.: PCT/JP2012/067448
§ 371 (c)(1),
(2), (4) Date: Feb. 12, 2014

(87) PCT Pub. No.: WO2013/008773
PCT Pub. Date: Jan. 17, 2013

(65) Prior Publication Data
US 2014/0158479 A1    Jun. 12, 2014

(30) Foreign Application Priority Data

Jul. 13, 2011   (JP) ................. 2011-154837

(51) Int. Cl.
*F16D 65/00*   (2006.01)
*B60T 1/06*    (2006.01)
(Continued)

(52) U.S. Cl.
CPC .............. *B60T 1/065* (2013.01); *B60T 13/741* (2013.01); *F16D 65/18* (2013.01); *F16D 66/00* (2013.01);
(Continued)

(58) Field of Classification Search
CPC .. F16D 65/18; F16D 66/00; F16D 2066/001; F16D 2066/005; F16D 2066/006; F16D 2121/18; F16D 2121/24; F16D 2125/20; F16D 2125/36; F16D 2125/40

USPC ............. 188/72.1, 72.7, 72.8, 158, 162, 164
See application file for complete search history.

(56) References Cited

U.S. PATENT DOCUMENTS 5,663,641 A * 9/1997 Morita .................... G01P 3/487
324/174
2004/0104618 A1    6/2004 Yamamoto et al.
(Continued)

FOREIGN PATENT DOCUMENTS

CN           1466528          1/2004
EP          1 557 334         7/2005
(Continued)

OTHER PUBLICATIONS

International Search Report issued Aug. 28, 2012 in International (PCT) Application No. PCT/JP2012/067448.
(Continued)

*Primary Examiner* — Robert A Siconolfi
*Assistant Examiner* — Vu Q Nguyen
(74) *Attorney, Agent, or Firm* — Wenderoth, Lind & Ponack, L.L.P.

(57) ABSTRACT

An electric brake system includes a linear motion mechanism for converting the rotation of a rotary shaft to a linear motion of an outer ring member, and configured such that the friction pad is pressed against the brake disk by the outer ring member. The brake system further includes a reaction force receiving member adapted to receive an axially rearward reaction force generated when the friction pad is moved axially forwardly and pressed against the brake disk, and a stationary member provided axially rearward of the reaction force receiving member. A magnetic pole row is mounted to the reaction force receiving member, while the magnetic sensor is mounted to the stationary member.

16 Claims, 7 Drawing Sheets

(51) Int. Cl.

| | | |
|---|---|---|
| *F16D 65/18* | (2006.01) | |
| *F16D 66/00* | (2006.01) | |
| *G01L 5/12* | (2006.01) | |
| *B60T 13/74* | (2006.01) | |
| *F16D 121/24* | (2012.01) | |
| *F16D 125/36* | (2012.01) | |
| *F16D 125/40* | (2012.01) | |
| *F16D 125/48* | (2012.01) | |

(52) U.S. Cl.
CPC ........... *G01L 5/12* (2013.01); *F16D 2066/005* (2013.01); *F16D 2121/24* (2013.01); *F16D 2125/36* (2013.01); *F16D 2125/40* (2013.01); *F16D 2125/48* (2013.01)

(56) References Cited

U.S. PATENT DOCUMENTS

| | | |
|---|---|---|
| 2004/0187591 A1 | 9/2004 | Baumann et al. |
| 2005/0067230 A1 | 3/2005 | Kramer |
| 2009/0108669 A1 | 4/2009 | Strecker |
| 2010/0320043 A1 | 12/2010 | Yamasaki et al. |
| 2011/0174581 A1 | 7/2011 | Vollert et al. |
| 2013/0327601 A1 | 12/2013 | Masuda et al. |
| 2014/0191627 A1 | 7/2014 | Takahashi et al. |

FOREIGN PATENT DOCUMENTS

| | | |
|---|---|---|
| EP | 2 253 866 | 11/2010 |
| EP | 2 662 587 | 11/2013 |
| EP | 2 738 532 | 6/2014 |
| JP | 2003-014018 | 1/2003 |
| JP | 2003/287063 | 10/2003 |
| JP | 2004-204990 | 7/2004 |
| JP | 2004-301835 | 10/2004 |
| JP | 2005-127509 | 5/2005 |
| JP | 2008-082894 | 4/2008 |
| JP | 2008-523334 | 7/2008 |
| WO | 2010/034640 | 4/2010 |

OTHER PUBLICATIONS

European Search Report issued Nov. 5, 2014 in corresponding European Patent Application EP 12 81 1302.
Chinese Office Action issued Sep. 1, 2015 in Chinese Application No. 201280034432.3 (with partial English translation).

\* cited by examiner

ELECTRIC BRAKE SYSTEM

TECHNICAL FIELD

This invention relates to an electric brake system used e.g. in a motor vehicle.

BACKGROUND ART

Many of older vehicle brake systems are hydraulic brake systems, which include a brake disk and friction pads driven by hydraulic cylinders and pressed against the brake disk. But with the recent introduction of new brake control systems such as anti-lock brake systems (ABS), electric brake systems, which do not use hydraulic circuits, are gathering much attention.

Electric brake systems include a rotary shaft driven by an electric motor, and a linear motion mechanism including a linear motion member and configured to convert the rotation of the rotary shaft to linear motion of the linear motion member such that the friction pad is pressed against the brake disk by the linear motion member. Many of such electric brake systems include a sensor for detecting the pressing force with which the friction pad is pressed against the brake disk in order to control the braking force to a desired value.

Electric brake systems including a sensor for detecting the pressing force of the friction pad are disclosed e.g. in JP Patent Publication 2003-287063A, JP Patent Publication 2003-014018A, and JP Patent Publication 2004-204990A.

The electric brake system disclosed in JP Patent Publication 2003-287063A has a caliper body including opposed pieces facing each other on both sides of the brake disk, and a bridge through which the opposed pieces are coupled together. A linear motion mechanism is mounted in the caliper body such that the friction pad is pressed against the brake disk by the linear motion member of the linear motion mechanism. A strain gauge is mounted in the caliper body at its portion where the bridge is joined to one of the opposed pieces to detect the pressing force of the friction pad.

The electric brake system disclosed in JP Patent Publication 2003-014018A also includes a caliper body including opposed pieces facing each other on both sides of the brake disk and coupled together by a bridge, and a linear motion mechanism mounted in the caliper body. A pair of electrodes are embedded in the linear motion member of the linear motion mechanism to detect the pressing force of the friction pad by measuring the electrical resistance between the electrodes, which changes corresponding to strain.

The electric brake system disclosed in JP Patent Publication 2004-204990A also includes a caliper body including opposed pieces facing each other on both sides of the brake disk and coupled together by a bridge, and a linear motion mechanism mounted in the caliper body. The pressing force of the friction pad is detected by measuring the pressure in a hydraulic pressure chamber defined in the linear motion member of the linear motion mechanism, which changes corresponding to strain.

Due to frictional heat generated between the friction pad and the brake disk, the temperature of and around the friction pad tends to rise.

In the electric brake system disclosed in JP Patent Publication 2003-287063A, since the strain sensor for detecting the pressing force of the friction pad is provided at the portion of the caliper body where the bridge is joined to one of the opposed pieces, the strain sensor tends to be heated to a high temperature, which makes it impossible to provide a circuit for processing the sensor signal sufficiently close to the strain sensor. This increases noise in the sensor signal. Also, when the caliper body is heated to high temperature, the temperature distribution become uneven, thus generating thermal strain. Since the strain sensor picks up such thermal strain too, it is difficult to measure only the strain due to the pressing force of the friction pad with high accuracy.

In the electric brake system of JP Patent Publication 2003-014018A too, since the electrodes for detecting the pressing force of the friction pad are provided in the linear motion member, the electrodes tend to be heated to high temperature, so that it is impossible to provide the signal processing circuit sufficiently close to the electrodes, so that noise in the sensor signal increases. Also, since the linear motion member, in which the electrodes are embedded, moves, it is necessary to arrange wires leading to the electrodes so as to be movable. This increases costs.

In the electric brake system disclosed in JP Patent Publication 2004-204990A, if hydraulic fluid in the hydraulic chamber leaks and air enters the hydraulic pressure chamber, the output of the hydraulic pressure sensor does not correspond to the pressing force of the friction pad any more. Thus this system has a problem in long-term reliability. In order to maintain liquid tightness of the hydraulic pressure chamber with high reliability, high costs are required.

SUMMARY OF THE INVENTION

An object of the present invention is to provide an electric brake system of which the sensor for detecting the pressing force of the friction pad is less likely to be influenced by frictional heat generated between the friction pad and the brake disk and can stably and accurately detect the pressing force of the friction pad.

In order to achieve this object, the present invention provides an electric brake system comprising a rotary shaft configured to be driven by an electric motor, a linear motion mechanism including a linear motion member and configured to convert the rotary motion of the rotary shaft to a linear motion of the linear motion member, a brake disk, and a friction pad configured to be pressed against the brake disk by the linear motion member, wherein the electric brake system further comprises a reaction force receiving member configured to receive an axially rearward reaction force applied to the linear motion member when the friction pad is moved axially forwardly and pressed against the brake disk by the linear motion member, wherein the reaction force receiving member is provided axially rearward of the linear motion member, a stationary member fixed in position at a location axially rearwardly spaced from the reaction force receiving member, a magnetic pole row mounted to one of the reaction force receiving member and the stationary member, and comprising N-poles and S-poles which are arranged alternately with and adjacent to each other in the axial direction, and a magnetic sensor mounted to the other of the reaction force receiving member and the stationary member so as to face the magnetic pole row in a direction perpendicular to the axial direction such that the magnetic sensor can detect a change in relative position between the magnetic sensor and the magnetic pole row in the axial direction.

With this arrangement, when the friction pad is pushed axially forwardly and pressed against the brake disk by the linear motion member of the linear motion mechanism, the axially rearward reaction force that acts on the linear motion member is received by the reaction force receiving member. The reaction force thus axially deforms the reaction force receiving member, thereby changing the relative position between the magnetic pole row and the magnetic sensor. This in turn changes output signal of the magnetic sensor corresponding to the pressing force of the friction pad. Thus, it is possible to detect the pressing force of the friction pad based on the output signal of the magnetic sensor.

Since the magnetic sensor is mounted, not on the linear motion member of the linear motion mechanism, but on the member which receives the reaction force, the distance between the friction pad and the magnetic sensor is long. Thus, the magnetic sensor is less likely to be influenced by frictional heat generated between the friction pad and the brake disk. By using the magnetic pole row made up of N-poles and S-poles arranged alternately with and adjacent to each other, the output signal of the magnetic sensor changes steeply when the relative position between the magnetic pole row and the magnetic sensor changes in the axial direction, while the output signal of the magnetic sensor scarcely changes when this relative position changes in a direction other than the axial direction. This minimizes the influence of external noise on the output signal of the magnetic sensor, thereby making it possible to detect the pressing force of the friction pad with high accuracy in a stable manner.

The magnetic pole row may comprise a plurality of permanent magnets of which N-poles and S-poles are arranged alternately with and adjacent to each other. This magnetic pole row is simpler in structure and thus less expensive than a magnetic pole row made up of electromagnetic coils.

In this arrangement, if the temperature of the permanent magnets rises due e.g. to the influence of frictional heat generated between the friction pad and the brake disk, the magnetic field generated by the permanent magnets decreases with the temperature rise. Thus, in order to stabilize the detection accuracy of the magnetic sensor, this brake system may be further provided with a temperature sensor provided in the vicinity of the magnetic sensor, and a correction control unit configured to correct the output signal of the magnetic sensor based on the output signal of the temperature sensor.

Preferably, a resistance thermometer sensor is used as the temperature sensor, because a resistance thermometer sensor can detect temperature with a smaller measurement error than a thermocouple, and can stably maintain high detection accuracy over a prolonged period of time.

The linear motion mechanism may comprise a plurality of planetary rollers kept in rolling contact with the cylindrical surface on the outer periphery of the rotary shaft, a carrier retaining the planetary rollers such that the planetary rollers can revolve around the rotary shaft while rotating about the axes of the respective planetary rollers, and restrained from axial movement, and a linear motion member in the form of an outer ring member surrounding the planetary rollers, in which the outer ring member has a helical rib formed on the inner periphery thereof, and the planetary rollers are each formed with a helical groove or circumferential grooves in the outer periphery thereof such that the helical rib is engaged in the helical grooves or the circumferential grooves. When the friction pad is pushed axially forwardly and pressed against the brake disk by the outer ring member as the linear motion member, the axially rearward reaction force that acts on the outer ring member is transmitted through the planetary rollers and the carrier to the reaction force receiving member and received by the reaction force receiving member. Thus, it is possible to detect the pressing force of the friction pad based on the output signal of the magnetic sensor which changes corresponding to the deformation of the reaction force receiving member.

In one arrangement, the reaction force receiving member comprises an annular plate portion axially supporting the carrier through a thrust bearing, and an inner tubular portion extending axially rearwardly from the radially inner edge of the annular plate portion, whereas the stationary member comprises a fixed plate portion arranged axially rearward of and facing the reaction force receiving member, and an outer tubular portion extending axially forwardly from the fixed plate portion so as to face the radially outer surface of the inner tubular portion, with the magnetic pole row mounted to one of the outer tubular portion and the inner tubular portion and the magnetic sensor mounted to the other. With this arrangement, since the members to which the magnetic pole row and the magnetic sensor are mounted are both tubular members, they are high in rigidity, so that the relative position between the magnetic pole row and the magnetic sensor is changed to a lesser degree by external vibration.

A rolling bearing may be mounted in the inner periphery of the reaction force receiving member to rotatably support the rotary shaft. With this arrangement, it is possible to more rigidly support the rotary shaft and also to minimize vibration of the reaction force receiving member due to external vibration.

As the magnetic sensor, an MR sensor using a magnetoresistance element or an MI sensor using a magnetoimpedance element may be used. But a Hall IC using a Hall element is preferably used, because a Hall IC can detect not only the intensity of the magnetic field but also the direction of the magnetic field, and thus can detect a change in relative position between the magnetic pole row and the magnetic sensor with higher accuracy. If neodymium magnets are used as the permanent magnets, the magnets can generate strong magnetic fields while taking up little space.

The magnetic pole row may comprise a plurality of electromagnetic coils of which N-poles and S-poles are arranged alternately with and adjacent to each other. In this case, the brake system may be further provided with a coil temperature sensor for measuring the temperature of the electromagnetic coils, and a current regulating circuit for changing the current applied to the electromagnetic coils according to the output signal of the coil temperature sensor such that the intensity of the magnetic field generated by the electromagnetic coils is constant. With this arrangement, since the electromagnetic coils can generate a stable magnetic field without being influenced by a change in temperature, the detection accuracy of the magnetic sensor improves.

In the electric brake system according to the present invention, since the magnetic sensor is mounted, not on the linear motion member of the linear motion mechanism, but on the member which receives the reaction force, the distance between the friction pad and the magnetic sensor is long. Thus, the area surrounding the magnetic sensor is less likely to be heated to a high temperature. By using the magnetic pole row made up of N-poles and S-poles arranged alternately with and adjacent to each other in the axial direction, the output signal of the magnetic sensor changes steeply when the relative position between the magnetic pole row and the magnetic sensor changes in the axial direction, while the output signal of the magnetic sensor scarcely changes when this relative position changes in a direction other than the axial direction. This minimizes the influence of external noise on the output signal of the magnetic sensor, thereby making it possible to detect the pressing force of the friction pad with high accuracy in a stable manner.

DETAILED DESCRIPTION OF THE INVENTION

Figure 1:
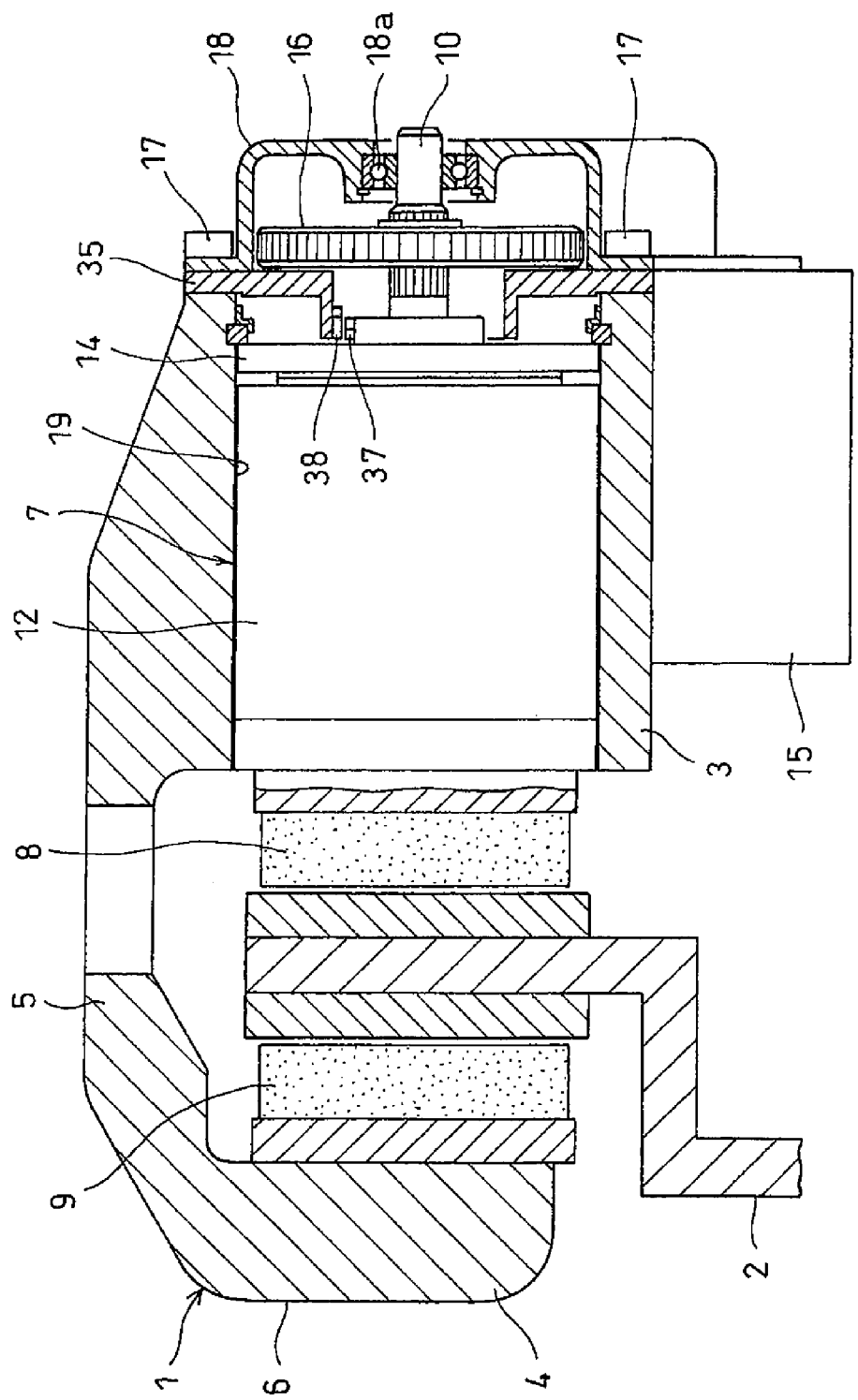
FIG. 1 is a sectional view of an electric brake system embodying the present invention.

FIG. 1 shows an electric brake system 1 embodying this invention. This electric brake system 1 includes a brake disk 2 adapted to rotate together with a vehicle wheel, and a caliper body 6 having opposed pieces 3 and 4 facing each other with the brake disk 2 therebetween, and a bridge 5 through which the opposed pieces 3 and 4 are coupled together. The brake system 1 further includes an electric linear motion actuator 7 mounted in a mounting hole 19 formed in the opposed piece 3 and open to the surface of the opposed piece 3 facing the brake disk 2, and a pair of right and left friction pads 8 and 9.

The friction pad 8 is provided between the opposed piece 3 and the brake disk 2, and supported by a pad pin (not shown) mounted to the caliper body 6 so as to be movable in the axial direction of the brake disk 2. The other friction pad 9 is mounted to the other opposed piece 4, on the opposite side. The caliper body 6 is supported so as to be slidable in the axial direction of the brake disk 2.

Figure 2:
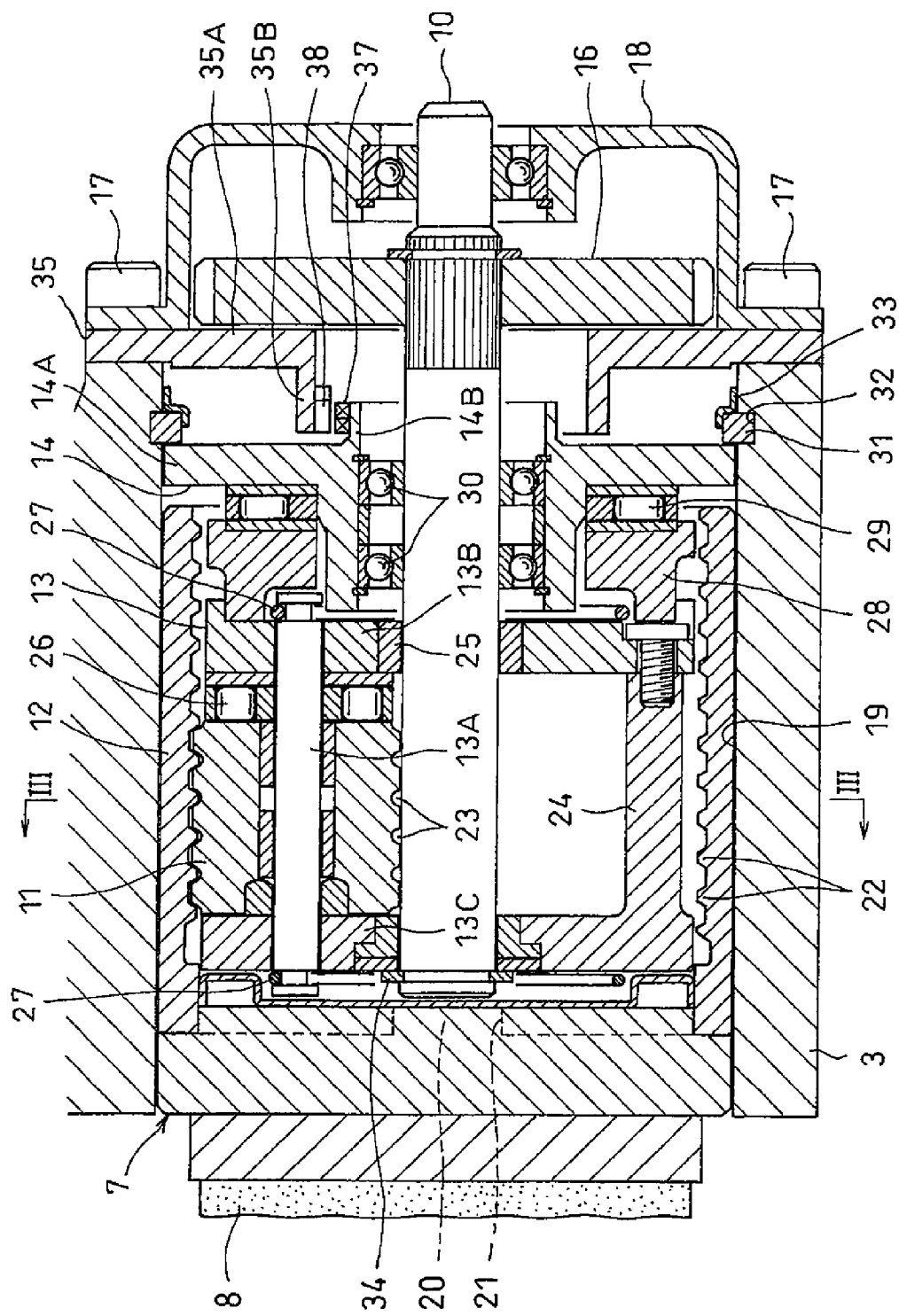
FIG. 2 is an enlarged sectional view of and around an electric linear motion actuator of FIG. 1.

As shown in FIG. 2, the electric linear motion actuator 7 includes a rotary shaft 10, a plurality of planetary rollers 11 kept in rolling contact with the cylindrical surface on the outer periphery of the rotary shaft 10, an outer ring member 12 surrounding the planetary rollers 11, a carrier 13 retaining the planetary rollers 11 so that the planetary rollers 11 can rotate about their respective axes while revolving around the rotary shaft 10, and a reaction force receiving member 14 disposed axially rearward of the outer ring member 12.

The rotary shaft 10 is connected to an electric motor 15 shown in FIG. 1 through a gear 16, and is rotated by the electric motor 15. The rotary shaft 10 is received in the mounting hole 19, which axially extends through the opposed piece 3, such that the rear end of the rotary shaft 10 protrudes from the rear opening of the mounting hole 19. The gear 16 is mounted on the portion of the rotary shaft 10 protruding from the mounting hole 10 and is rotationally fixed to the rotary shaft 10 by means of splines. The gear 16 is covered by a lid 18 fixed in position by bolts 17 to close the rear end of the mounting hole 19. A bearing 18a is mounted in the lid 18 to rotatably support the rotary shaft 10.

Figure 3:
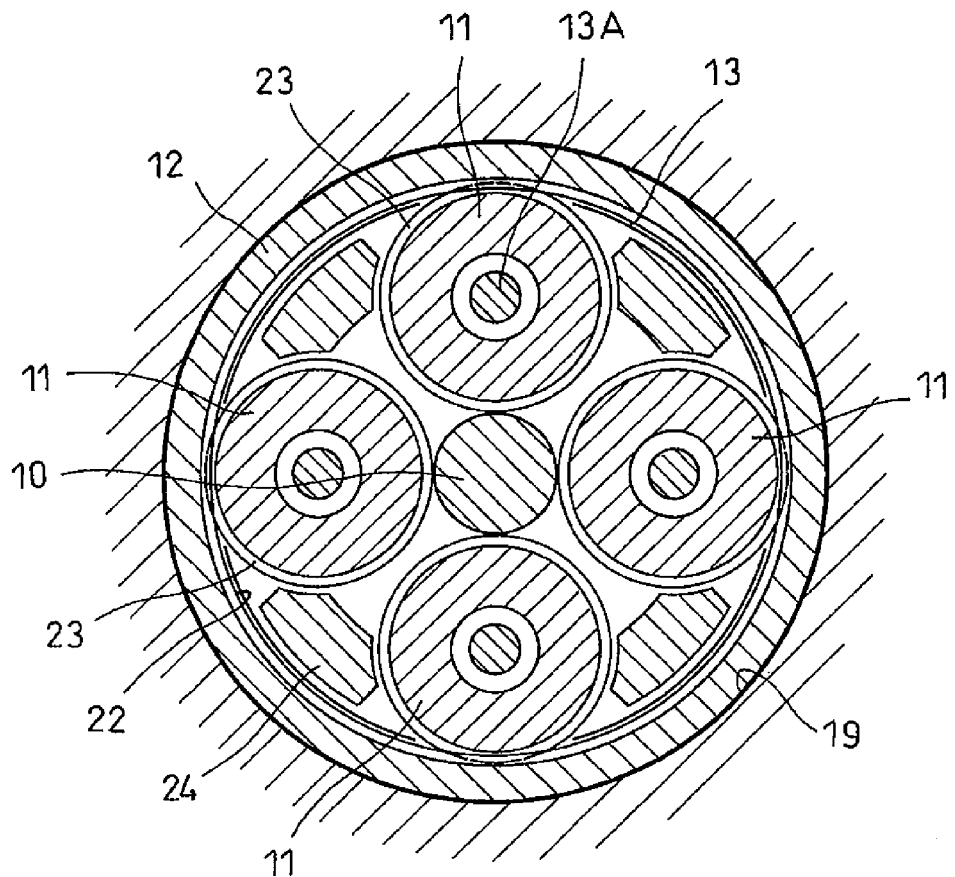
FIG. 3 is a sectional view taken along line III-III of FIG. 2.

As shown in FIG. 3, the planetary rollers 11 are kept in rolling contact with the cylindrical surface on the outer periphery of the rotary shaft 10 such that when the rotary shaft 10 rotates, the planetary rollers 11 rotate together with the rotary shaft 10 due to friction between the planetary rollers 11 and the rotary shaft 10. The planetary rollers 11 are circumferentially arranged at regular intervals.

As shown in FIG. 2, the outer ring member 12 is received in the mounting hole 19, which is formed in the opposed piece 3 of the caliper body 6, so as to be axially slidable along the wall of the mounting hole 19. The outer ring member 12 has engaging recesses 21 formed in the axial front end thereof in which engaging protrusions 20 formed on the backside of the friction pad 8 are engaged. By the engagement between the engaging protrusions 20 and the engaging recesses 21, the outer ring member 12 is rotationally fixed to the caliper body 6.

A helical rib 22 is formed on the inner periphery of the outer ring member 12. The helical rib 22 is engaged in circumferential grooves 23 formed in the outer periphery of each of the planetary rollers 11 such that when the planetary rollers 11 rotate, the outer ring member 12 is moved axially with the helical rib 22 of the outer ring member 12 guided by the circumferential grooves 23. In the embodiment, circumferential grooves 23, i.e. grooves having a lead angle of zero degrees are formed in the outer periphery of each planetary roller 11. But instead of such circumferential grooves 23, a helical groove having a different lead angle from the helical rib 22 may be formed.

The carrier 13 includes carrier pins 13A rotatably supporting the respective planetary rollers 11, an annular carrier plate 13C keeping the front ends of the carrier pins 13A circumferentially spaced apart at regular intervals, and a carrier body 13B keeping the rear ends of the carrier pins 13A circumferentially spaced apart at regular intervals. The carrier plate 13C and the carrier body 13B are axially opposed to each other with the planetary rollers 11 therebetween, and are coupled together by coupling rods 24 extending between the circumferentially adjacent planetary rollers 11.

The carrier body 13B is supported by the rotary shaft 10 through a slide bearing 25 so as to be rotatable relative to the rotary shaft 10. Thrust bearings 26 are mounted between the respective planetary rollers 11 and the carrier body 13B to prevent the rotation of the planetary rollers 11 about their respective axes from being transmitted to the carrier body 13B.

Compression ring springs 27 are each wrapped around the circumferentially spaced apart carrier pins 13A to radially inwardly bias the carrier pins 13A. Thus, under the biasing force of the compression ring springs 27, the outer peripheries of the planetary rollers 11 are pressed against the outer periphery of the rotary shaft 10, thus preventing slippage between the rotary shaft 10 and the planetary rollers 11. In order to apply the biasing force of the compression ring springs 27 over the entire axial lengths of the planetary rollers 11, one of the compression ring springs 27 is wrapped around first ends of the carrier pins 13A, while the other compression spring 27 is wrapped around the opposite second ends of the carrier pins 13A.

The reaction force receiving member 14 is fitted in the mounting hole 19 at a position axially rearward of the outer ring member 12. The reaction force receiving member 14 includes an annular plate portion 14A axially supporting the carrier 13 through a spacer 28 which revolves around the rotary shaft 10 together with the carrier 13, and a thrust bearing 29; and an inner tubular portion 14B extending axially rearwardly from the radially inner edge of the annular plate portion 14A. The thrust bearing 29 prevents the rotation of the carrier 13 around the rotary shaft 10 from being transmitted to the reaction force receiving member 14. A plurality of rolling bearings 30 are mounted axially spaced from each other in the inner periphery of the reaction force receiving member 14 to rotatably support the rotary shaft 10.

The reaction force receiving member 14 is restrained from axial rearward movement by a snap ring 31 which engages the outer peripheral edge of the annular plate portion 14A. The snap ring 31 is fitted in a circumferential groove 32 formed in the wall of the mounting hole 19 at its portion axially rearward of the area where the outer ring member 12 slides. The snap ring 31 is made up of a plurality of circular arc-shaped split members combined into a ring shape. An annular retainer 33 restrains radial movement of the snap ring 31, thereby retaining the snap ring 31 in the circumferential groove 32.

The reaction force receiving member 14 restrains axial rearward movement of the carrier 13 by axially supporting the carrier body 13B through the spacer 28 and the thrust bearing 29. The carrier 13 is also restrained from axial forward movement. Thus, the carrier 13 is restrained from both forward and rearward axial movements. The planetary rollers 11, which are retained by the carrier 13, are also restrained from axial movement.

A stationary member 35 is fixed to the opposed piece 3 while being axially rearwardly spaced from the reaction force receiving member 14. The stationary member 35 may be fixed in position by being sandwiched between the opposed piece 3 and the lid 18. The stationary member 35 includes a fixed plate portion 35A provided axially rearwardly of and facing the reaction force receiving member 14, and an outer tubular portion 35B extending axially forwardly from the fixed plate portion 35A so as to face the radially outer surface of the inner tubular portion 14B of the pressure receiving member 14.

Figure 4:
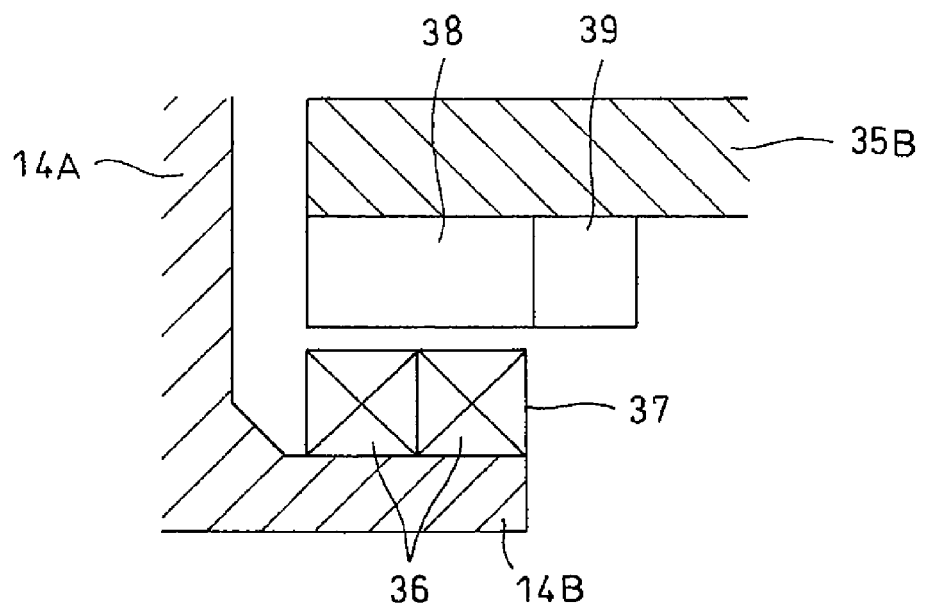
FIG. 4 is an enlarged sectional view of and around a magnetic sensor.

As shown in FIG. 4, a plurality of permanent magnets 36 are mounted on the outer periphery of the inner tubular portion 14B of the reaction force receiving member 14 such that N-poles and S-poles thereof are arranged alternately with and adjacent to each other, thereby defining a magnetic pole row 37 of which N-poles and S-poles are arranged alternately with and adjacent to each other in the axial direction. The respective permanent magnets 36 are magnetized in the radial direction such that N-poles and S-poles form at the radially outer and radially inner ends of each permanent magnet 36, respectively.

If neodymium magnets are used as the permanent magnets 36, the magnets 36 can generate strong magnetic fields while taking up little space. But as the permanent magnets 36, samarium-cobalt magnets, Alnico magnets, or ferrite magnets may be used instead. If samarium-cobalt magnets or Alnico magnets are used as the permanent magnets 36, the magnetic fields generated from the permanent magnets are less likely to decrease with a temperature rise of the permanent magnets 36, so that the intensity of the magnetic field is stable when the temperature of the permanent magnets 36 rises.

A magnetic sensor 38 is mounted on the inner periphery of the outer tubular portion 35B of the stationary member 35 so as to face the magnetic pole row 37 in a direction perpendicular to the axial direction (radial direction in the figures). The magnetic sensor 38 is arranged on lines extending from the respective permanent magnets 36 in the direction in which the magnets 36 are magnetized such that the magnetic sensor 38 can detect a change in magnetic field when the relative position between the magnetic sensor 38 and the magnetic pole row 37 changes in the axial direction, thereby detecting an axial change in relative position between the inner tubular portion 14B and the outer tubular portion 35B based on the change in magnetic field as detected. As the magnetic sensor 38, an MR sensor using a magnetoresistance element or an MI sensor using a magneto-impedance element may be used. But a Hall IC using a Hall element is preferably used, because a Hall IC can detect not only the intensity of the magnetic field but also the direction of the magnetic field, and thus can detect a change in relative position between the magnetic pole row 37 and the magnetic sensor 38 with higher accuracy.

A temperature sensor 39 is mounted on the inner periphery of the outer tubular portion 35B in the vicinity of the magnetic sensor 38. A thermocouple may be used as the temperature sensor 39. But preferably, a resistance thermometer sensor (thermistor) is used as the temperature sensor 39, because a resistance thermometer sensor can detect temperature with a smaller measurement error than a thermocouple, and can stably maintain high detection accuracy over a prolonged period of time. A circuit for processing the output signals of the magnetic sensor 39 and the temperature sensor 39 includes a correction control unit for correcting the output signal of the magnetic sensor 38 based on the output signal of the temperature sensor 39. The correction control unit corrects the output signal of the magnetic sensor 38 so as to compensate for the amount of reduction in magnetic field generated from the permanent magnets 36 due to a temperature rise of the permanent magnets 36.

The operation of the electric brake system 1 is now described.

When the electric motor 15 is activated, the rotary shaft 10 is rotated, so that the planetary rollers 11 revolve around the rotary shaft 10 while rotating about the respective carrier pins 13A. This causes the outer ring member 12 and the planetary rollers 11 to rotate relative to each other due to engagement of the helical rib 22 in the circumferential grooves 23. But since the planetary rollers 11 as well as the carrier 13 are restrained from axial movement, only the outer ring member 12 is moved axially with the planetary rollers 11 not movable in the axial direction. Thus in this electric brake system 1, the rotation of the rotary shaft 10, which is driven by the electric motor 15, is converted to axial movement of the outer ring member 12 such that the friction pad 8 is pressed against the brake disk 2 by the outer ring member 12, thereby generating a braking force.

When the friction pad 8 is moved axially forwardly and pressed against the brake disk by the outer ring member 12, an axially rearward reaction force is applied to the outer ring member 12. This reaction force is transmitted through the planetary rollers 11, carrier 13, spacer 28 and thrust bearing 29 and received by the reaction force receiving member 14. The reaction force thus causes axial deformation of the reaction force receiving member 14 such that the relative position between the magnetic pole row 37 and the magnetic sensor 38 changes in the axial direction. As a result, the output signal of the magnetic sensor 38 changes according to the pressing force with which the friction pad 8 is pressed against the brake disk. Thus, it is possible to detect the pressing force with which the friction pad 8 is pressed against the brake disk based on the output signal of the magnetic sensor 38. It is also possible to control the braking force of the electric brake system 1 using the output signal of the magnetic sensor 38.

When the friction pad 8 is pushed forward and pressed against the brake disk 2, frictional heat is generated between the friction pad 8 and the brake disk 2, which increases the temperature of and around the friction pad 8. Thus, if the sensor for detecting the pressing force of the friction pad 8 is provided on or in the bridge 5 of the caliper body 6 or on or in the linear motion member of the electric linear motion actuator 7 (i.e. the outer ring member 12), the sensor is heated to such a high temperature that the circuit for processing the output signal of sensor cannot be placed sufficiently close to the sensor. Thus, noise is more likely to be generated.

With the above-described electric brake system 1, since the magnetic sensor 38 is provide not in or on the linear motion member (outer ring member 12) of the linear motion actuator 7 but on its portion which receives a reaction force applied to the linear motion member (i.e. the reaction force receiving member 14), the distance from the friction pad 8 to the magnetic sensor 38 is sufficiently long that the temperature of and around the magnetic sensor 38 is less likely to rise. This makes it possible to detect the pressing force of the friction pad 8 with high accuracy.

In the electric brake system 1, a magnetic pole row 37 is used in which N-poles and S-poles are arranged alternately with and adjacent to each other in the axial direction, the output signal of the magnetic sensor 38 changes steeply and suddenly when the relative position between the magnetic pole row 37 and the magnetic sensor 38 changes in the axial direction, while the output signal of the magnetic sensor 38 scarcely changes for a change in relative position in a direction other than the axial direction. Especially in the vicinity of the boundary between any adjacent N-pole and S-pole, the magnetic field changes steeply when the above relative position changes even slightly. Thus, the output signal of the magnetic sensor 38 is less likely to be influenced by external vibration, so that it is possible to stably and accurately detect the pressing force of the friction pad 8.

In this electric brake system 1, since the portions on which the magnetic pole row 37 and the magnetic sensor 38 are respectively mounted are both tubular in shape (outer tubular portion 35B and inner tubular portion 14B), these portions are high in rigidity, so that the relative position between the magnetic pole row 37 and the magnetic sensor 38 is changed to a lesser degree by external vibration. Further, the rolling bearings 30 mounted on the inner periphery of the reaction force receiving member 14 to rotatably support the rotary shaft 10 minimize vibration of the reaction force receiving member 14 due to external vibration, thus improving the detection accuracy of the magnetic sensor 38 in an extremely stable manner.

When a reaction force applied to the outer ring member 12 is received by the reaction force receiving member 14, the reaction force receiving member 14 is deformed more markedly at its radially inner portion than at its radially outer portion. Thus by providing the inner tubular portion 14B, on which the magnetic pole row 37 is mounted, so as to face not the radially outer portion of the stationary member 35 but the radially inner portion of the stationary member 35, as in the embodiment, it is possible to detect the pressing force of the friction pad 8 with high accuracy.

One way to detect the pressing force of the friction pad 8 would be to estimate the pressing force of the friction pad 8 based on the axial displacement of the outer ring member 12 when the friction pad 8 is moved axially forwardly and pressed against the brake disk by the outer ring member 12. But with this arrangement, the pressing force of the friction pad 8 as detected tends to be unstable due to the influence of hysteresis of the electric brake system. In contract, in the electric brake system 1 according to the present invention, since the pressing force of the friction pad 8 is detected based on the deformation of the reaction force receiving member 14 due to a reaction force applied thereto when the friction pad 8 is moved axially forwardly and pressed against the brake disk by the outer ring member 12, hysteresis of the electric brake system 1 has no influence on the result of detection, so that the magnetic sensor can stably maintain high detection performance for a prolonged period of time.

Figure 5:
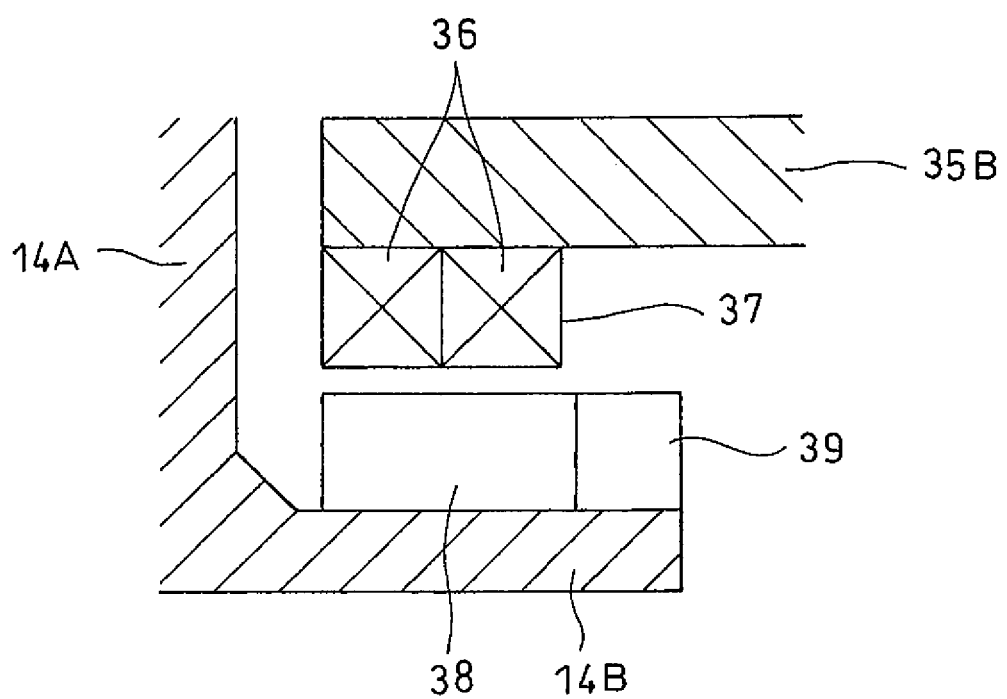
FIG. 5 is view similar to FIG. 4 in which the magnetic sensor is arranged in a different manner from FIG. 4.

In the above-described embodiment, the permanent magnets 36 are mounted on the inner tubular portion 14B of the pressure receiving member 14, while the magnetic sensor 38 is mounted on the outer tubular portion 35B of the stationary member 35. But as shown in FIG. 5, the magnetic sensor 38 may be mounted on the inner tubular portion 14B of the reaction force receiving member 14, while the permanent magnet 36 may be mounted on the outer tubular portion 35B of the stationary member 35.

The magnetic pole row 37 preferably comprises permanent magnets 36 arranged such that their N-poles and S-poles are positioned alternately with and adjacent to each other, because such a magnetic pole row is simple in structure and is less expensive. But instead, a magnetic pole row 37 may be used which comprises a plurality of electromagnetic coils of which N-poles and S-poles are arranged alternately with and adjacent to each other. In the latter arrangement, it is preferable to provide a coil temperature sensor for measuring the temperature of the electromagnetic coils, and a current regulating circuit for changing the current applied to the electromagnetic coils according to the output signal of the coil temperature sensor such that the intensity of the magnetic field generated by the electromagnetic coils is constant. With this arrangement, since the electromagnetic coils can generate a stable magnetic field without being influenced by a change in temperature, the detection accuracy of the magnetic sensor 38 improves.

In the above embodiment, the linear motion mechanism for converting the rotary motion of the rotary shaft 10 to a linear motion of the linear motion member is a planetary roller mechanism comprising the plurality of planetary rollers 11, which are in rolling contact with the cylindrical surface on the outer periphery of the rotary shaft 10, the carrier 13, which retains the planetary rollers 11 such that the planetary rollers 11 can revolve and rotate, and is restrained from axial movement, and the outer ring member 12 surrounding the planetary rollers 11 such that the helical rib 22 formed on the inner periphery of the outer ring member 12 is engaged in the helical grooves or circumferential grooves formed in the outer peripheries of the planetary rollers 11. But the present invention is equally applicable to an electric brake system which uses a different linear motion mechanism too.

Figure 6:
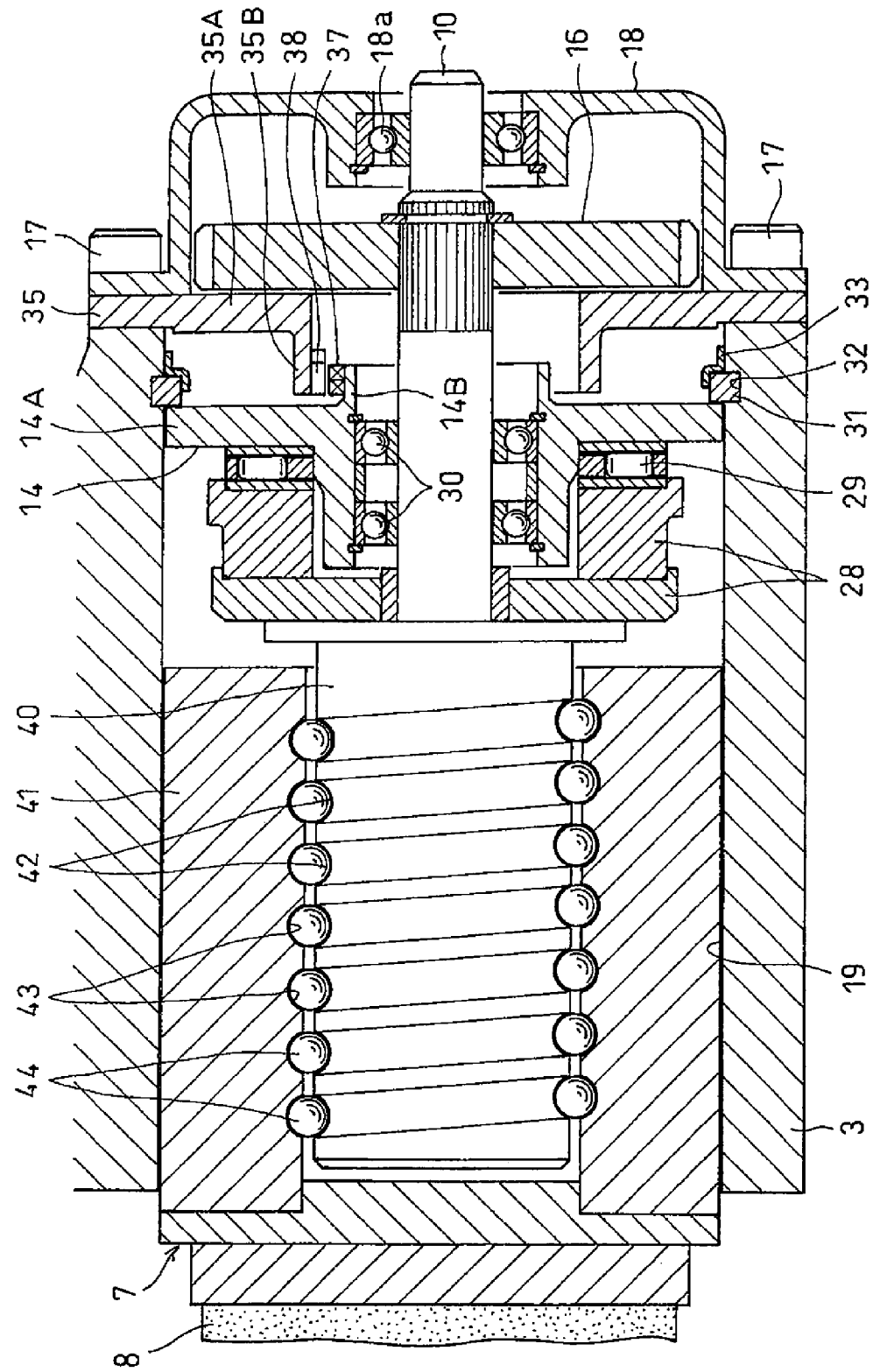
FIG. 6 is an enlarged sectional view of an electric linear motion actuator which includes a linear motion mechanism in the form of a ball-screw mechanism.

By way of example thereof, FIG. 6 shows a linear motion actuator including a ball-screw mechanism as the linear motion mechanism. In the following description of FIG. 6, elements corresponding to those of the above embodiment are denoted by identical numerals and their description is omitted.

In FIG. 6, the linear motion actuator 7 comprises a rotary shaft 10, a threaded shaft 40 integral with the rotary shaft 10, a nut 41 surrounding the threaded shaft 40, a plurality of balls 44 disposed between a thread groove 42 formed in the outer periphery of the threaded shaft 40 and a thread groove 43 formed in the inner periphery of the nut 41, a return tube, not shown, through which the balls 44 are returned from the terminal end to the starting end, of the thread groove 43 of the nut 41, and the reaction force receiving member 14, which is provided axially rearward of the nut 41.

The nut 41 is received in the mounting hole 19 formed in the opposed piece 3 of the caliper body 6 so as to be rotationally fixed and axially slidable, relative to the caliper body 6. Spacers 28 are provided at the axially rear end of the threaded shaft 40 so as to rotate together with the threaded shaft 40. The spacers 28 are supported by the reaction force receiving member 14 through a thrust bearing 29. The reaction force receiving member 14 axially supports the nut 41 through the spacers 28 and the thrust bearing 29, thereby restricting axial rearward movement of the nut 41.

This linear motion actuator 7 is configured such that when the rotary shaft 10 is rotated, the threaded shaft 40 and the nut 41 are rotated relative to each other such that the nut 41 is moved axially forward. At this time, an axial rearward reaction force is applied to the threaded shaft 40. The reaction force is transmitted to the reaction force receiving member 14 through the spacers 28 and the thrust bearing 29, and received by the reaction force receiving member 14. The reaction force thus deforms the reaction force receiving member 14 in the axial direction, changing the relative position between the magnetic pole row 37 and the magnetic sensor 38. This in turn changes the output signal of the magnetic sensor 38 corresponding to the pressing force of the friction pad 8, in the same manner as in the first embodiment. Thus, it is possible to detect the pressing force of the friction pad 8 based on the output signal of the magnetic sensor 38.

Figure 7:
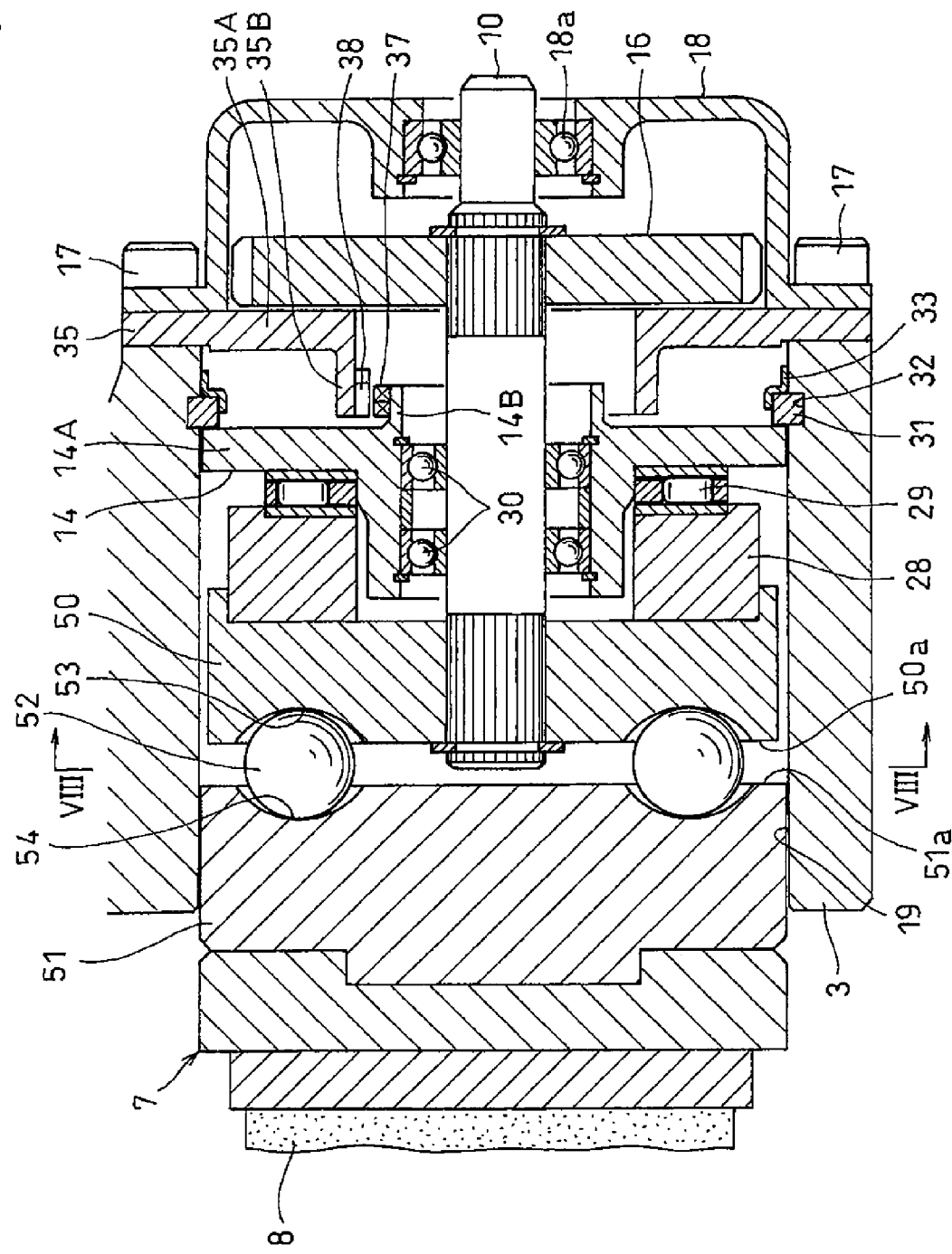
FIG. 7 is an enlarged sectional view of an electric linear motion actuator which includes a linear motion mechanism in the form of a ball-ramp mechanism.

FIG. 7 shows an electric brake system including a ball-ramp mechanism as the linear motion mechanism.

The electric linear motion actuator 7 of FIG. 7 includes a rotary shaft 10, a rotary disk 50 rotationally fixed to the outer periphery of the rotary shaft 10, a linear motion disk 51 provided axially forward of the rotary disk 50 and facing the rotary disk 50, a plurality of balls 52 sandwiched between the rotary disk 50 and the linear motion disk 51, and the reaction force receiving member 14, which is provided axially rearward of the linear motion disk 51.

The linear motion disk 51 is received in the mounting hole 19 formed in the opposed piece 3 of the caliper body 6 so as to be rotationally fixed and axially slidable, relative to the caliper body 6. A spacer 28 is provided at the axially rear end of the rotary disk 50 so as to rotate together with the rotary disk 50. The spacer 28 is supported by the reaction force receiving member 14 through a thrust bearing 29. The reaction force receiving member 14 axially supports the rotary disk 50 through the spacer 28 and the thrust bearing 29, thereby restricting axial rearward movement of the rotary disk 50.

Figure 8:
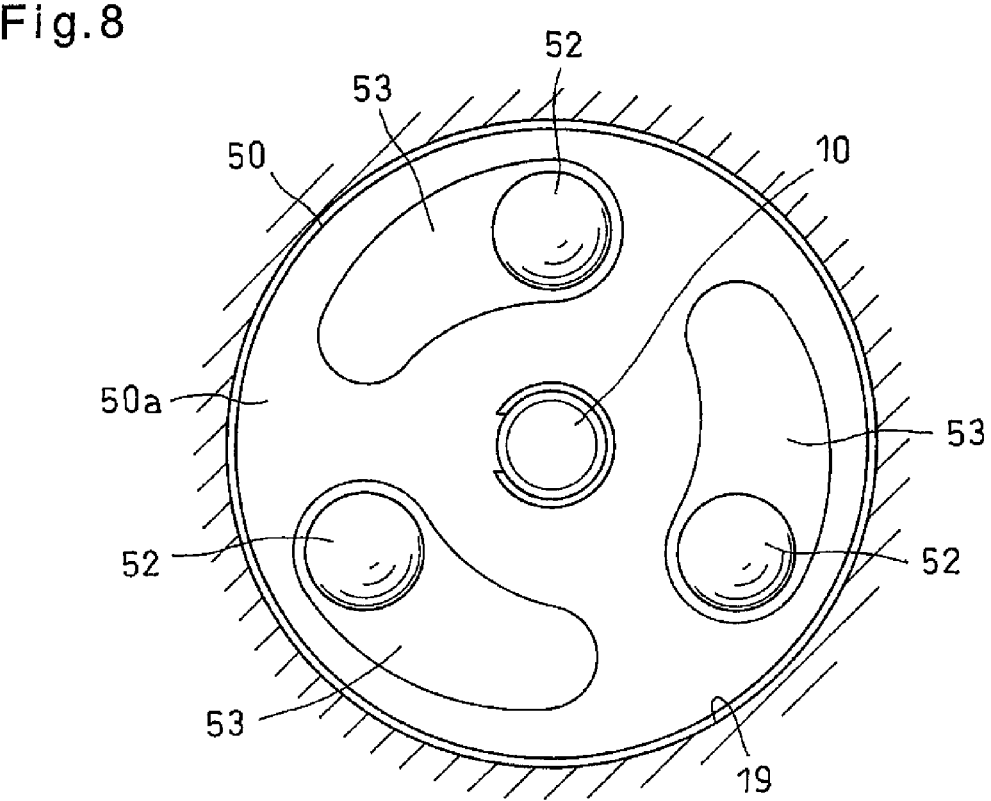
FIG. 8 is a sectional view taken along line VIII-VIII of FIG. 7.
Figure 9A:
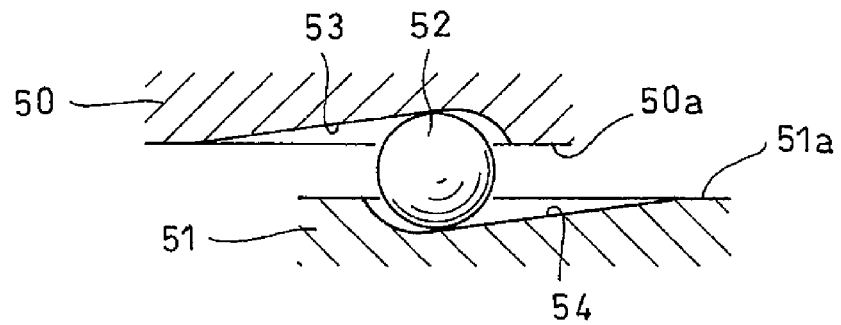
FIG. 9(a) shows the relationship between a ball and inclined grooves shown in FIG. 7.
Figure 9B:
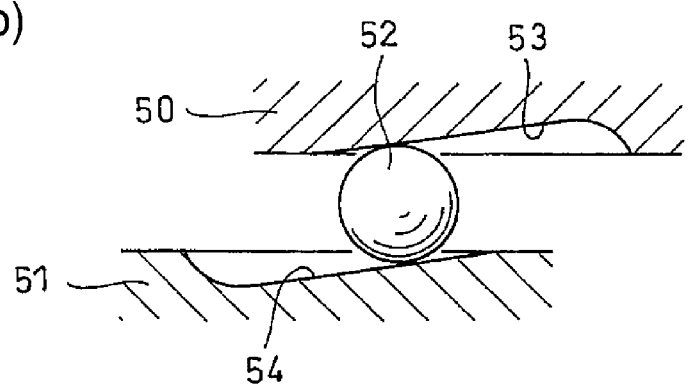
FIG. 9(b) shows a state in which a rotary disk and a linear motion disk have rotated relative to each other from the state of FIG. 9(a) and the distance between the disks has increased from the state of FIG. 9(a).

As shown in FIGS. 7 and 8, inclined grooves 53 are formed in the opposed surface 50*a* of the rotary disk 50 facing the linear motion disk 51 such that the depth of each inclined groove 53 gradually decreases in one of the opposite circumferential directions, while inclined grooves 54 are formed in the opposed surface 51*a* of the linear motion disk 51 facing the rotary disk 50 such that the depth of each inclined groove 54 gradually decreases in the other of the opposite circumferential directions. As shown in FIG. 9(*a*), the balls 52 are each received between the corresponding pair of the inclined grooves 53 of the rotary disk 50 and the inclined grooves 54 of the linear motion disk 51. As shown in FIG. 9(*b*), when the rotary disk 50 rotates relative to the linear motion disk 51, the balls 52 roll in the respective pairs of inclined grooves 53 and 54 such that the distance between the rotary disk 50 and the linear motion disk 51 increases.

In this electric linear motion actuator 7, when the rotary shaft 10 is rotated, the linear motion disk 51 and the rotary disk 50 rotate relative to each other such that the linear motion disk 51 is moved axially forwardly. At this time, an axially rearward reaction force acts on the rotary disk 50. The reaction force is transmitted through the spacer 28 and the thrust bearing 29 and received by the reaction force receiving member 14. The reaction force thus axially deforms the reaction force receiving member 14 such that the relative position between the magnetic pole row 37 and the magnetic sensor 38 changes in the axial direction. As a result, the output signal of the magnetic sensor 38 changes corresponding to the pressing force of the friction pad 8, so that it is possible to detect the pressing force of the friction pad 8 based on the output signal of the magnetic sensor 38, in the same manner as with the above-described other embodiments.

What is claimed is:

1. An electric brake system comprising:
    a rotary shaft configured to be driven by an electric motor to rotate about a rotary axis extending in an axial direction;
    a linear motion mechanism including a linear motion member and configured to convert a rotary motion of the rotary shaft to a linear motion of the linear motion member;
    a brake disk;
    a friction pad configured to be pressed against the brake disk by the linear motion member;
    a reaction force receiving member located axially rearward of the linear motion member, and configured to receive an axially rearward reaction force applied to the linear motion member when the friction pad is moved axially forwardly and pressed against the brake disk by the linear motion member, and to be axially deformed under the axially rearward reaction force;
    a stationary member fixed in position at a location axially rearwardly spaced from the reaction force receiving member;
    a magnetic pole row mounted to one of the reaction force receiving member and the stationary member, and comprising N-poles and S-poles which are arranged alternately with and adjacent to each other along the axial direction; and
    a magnetic sensor mounted to the other of the reaction force receiving member and the stationary member so as to face the magnetic pole row in a direction perpendicular to the axial direction such that when the reaction force receiving member is axially deformed, relative axial movement in the axial direction of the magnetic pole row with respect to the magnetic sensor occurs, such that the magnetic sensor can detect a change in relative axial position between the magnetic sensor and the magnetic pole row in the axial direction.

2. The electric brake system of claim 1, wherein the magnetic pole row comprises a plurality of permanent magnets of which N-poles and S-poles are arranged alternately with and adjacent to each other.

3. The electric brake system of claim 1, further comprising a temperature sensor provided in a vicinity of the magnetic sensor, and a correction control unit configured to correct an output signal of the magnetic sensor based on an output signal of the temperature sensor.

4. The electric brake system of claim 3, wherein the temperature sensor comprises a resistance thermometer sensor.

5. The electric brake system of claim 1, wherein the linear motion mechanism comprises a plurality of planetary rollers kept in rolling contact with a cylindrical surface on an outer periphery of the rotary shaft, a carrier retaining the planetary rollers such that the planetary rollers can revolve around the rotary shaft while rotating about axes of the respective planetary rollers, and restrained from axial movement, and the linear motion member, wherein the linear motion member comprises an outer ring member surrounding the plurality of planetary rollers, and wherein the outer ring member has a helical rib formed on an inner periphery of the outer ring member, and the planetary rollers are each formed with a helical groove or circumferential grooves in an outer periphery of the planetary roller such that the helical rib is engaged in the helical grooves or the circumferential grooves.

6. The electric brake system of claim 5, wherein the reaction force receiving member comprises an annular plate portion axially supporting the carrier through a thrust bearing, and an inner tubular portion extending axially rearwardly from a radially inner edge of the annular plate portion, wherein the stationary member comprises a fixed plate portion arranged axially rearward of and facing the reaction force receiving member, and an outer tubular portion extending axially forwardly from the fixed plate portion so as to face a radially outer surface of the inner tubular portion, and wherein the magnetic pole row is mounted to one of the outer tubular portion and the inner tubular portion and the magnetic sensor is mounted to the other of the outer tubular portion and the inner tubular portion.

7. The electric brake system of claim 6, further comprising a rolling bearing mounted in an inner periphery of the reaction force receiving member and rotatably supporting the rotary shaft.

8. The electric brake system of claim 1, wherein the magnetic sensor comprises a Hall IC.

9. The electric brake system of claim 2, wherein the permanent magnets comprise neodymium magnets.

10. The electric brake system of claim 1, wherein the magnetic pole row comprises a plurality of electromagnetic coils of which N-poles and S-poles are arranged alternately with and adjacent to each other.

11. The electric brake system of claim 10, further comprising a coil temperature sensor for measuring a temperature of the electromagnetic coils, and a current regulating circuit for changing a current applied to the electromagnetic coils according to an output signal of the coil temperature sensor such that an intensity of a magnetic field generated by the electromagnetic coils is constant.

12. The electric brake system of claim 2, further comprising a temperature sensor provided in a vicinity of the magnetic sensor, and a correction control unit configured to correct an output signal of the magnetic sensor based on an output signal of the temperature sensor.

13. The electric brake system of claim 2, wherein the linear motion mechanism comprises a plurality of planetary rollers kept in rolling contact with a cylindrical surface on an outer periphery of the rotary shaft, a carrier retaining the planetary rollers such that the planetary rollers can revolve around the rotary shaft while rotating about axes of the respective planetary rollers, and restrained from axial movement, and the linear motion member, wherein the linear motion member comprises an outer ring member surrounding the plurality of planetary rollers, and wherein the outer ring member has a helical rib formed on an inner periphery of the outer ring member, and the planetary rollers are each formed with a helical groove or circumferential grooves in an outer periphery of the planetary roller such that the helical rib is engaged in the helical grooves or the circumferential grooves.

14. The electric brake system of claim 3, wherein the linear motion mechanism comprises a plurality of planetary rollers kept in rolling contact with a cylindrical surface on an outer periphery of the rotary shaft, a carrier retaining the planetary rollers such that the planetary rollers can revolve around the rotary shaft while rotating about axes of the respective planetary rollers, and restrained from axial movement, and the linear motion member, wherein the linear motion member comprises an outer ring member surrounding the plurality of planetary rollers, and wherein the outer ring member has a helical rib formed on an inner periphery of the outer ring member, and the planetary rollers are each formed with a helical groove or circumferential grooves in an outer periphery of the planetary roller such that the helical rib is engaged in the helical grooves or the circumferential grooves.

15. The electric brake system of claim 4, wherein the linear motion mechanism comprises a plurality of planetary rollers kept in rolling contact with a cylindrical surface on an outer periphery of the rotary shaft, a carrier retaining the planetary rollers such that the planetary rollers can revolve around the rotary shaft while rotating about axes of the respective planetary rollers, and restrained from axial movement, and the linear motion member, wherein the linear motion member comprises an outer ring member surrounding the plurality of planetary rollers, and wherein the outer ring member has a helical rib formed on an inner periphery of the outer ring member, and the planetary rollers are each formed with a helical groove or circumferential grooves in an outer periphery of the planetary roller such that the helical rib is engaged in the helical grooves or the circumferential grooves.

16. The electric brake system of claim 12, wherein the linear motion mechanism comprises a plurality of planetary rollers kept in rolling contact with a cylindrical surface on an outer periphery of the rotary shaft, a carrier retaining the planetary rollers such that the planetary rollers can revolve around the rotary shaft while rotating about axes of the respective planetary rollers, and restrained from axial movement, and the linear motion member, wherein the linear motion member comprises an outer ring member surrounding the plurality of planetary rollers, and wherein the outer ring member has a helical rib formed on an inner periphery of the outer ring member, and the planetary rollers are each formed with a helical groove or circumferential grooves in an outer periphery of the planetary roller such that the helical rib is engaged in the helical grooves or the circumferential grooves.

* * * * *